May 3, 1960

K. M. GERTEIS 2,935,248

COMPRESSOR VALVE ARRANGEMENT

Filed Oct. 3, 1957

INVENTOR.
KARL M. GERTEIS
BY
Herman Seid
ATTORNEY

United States Patent Office 2,935,248
Patented May 3, 1960

2,935,248

COMPRESSOR VALVE ARRANGEMENT

Karl M. Gerteis, Syracuse, N.Y., assignor to Carrier Corporation, Syracuse, N.Y., a corporation of Delaware Application October 3, 1957, Serial No. 687,975

2 Claims. (Cl. 230—231)

This invention relates to compressor valve assemblies and more particularly to compressor valve assemblies containing suction and discharge valves.

In my copending application Serial No. 687,977, filed October 3, 1957, there is disclosed a reciprocating compressor in which the cylinders are radially disposed and discharge into an annular space encompassing said cylinders. The present invention is directed to an improved compressor valve arrangement for use in compressors of this type.

Normally in compressors the valve assemblies are sandwiched between the cylinder block and the cylinder head. The valve assembly has a large number of bolt holes passing therethrough and both sides of the valve assembly require careful machining to provide adequate sealing surfaces on both sides thereof. The present invention envisions a unitary valve assembly having the suction and discharge valves included therein, having no bolt holes passing therethrough and requiring only a single sealing side.

The chief object of the present invention is to provide a compressor having an improved valve arrangement.

An object of the present invention is to provide an inexpensive unitary valve assembly.

A still further object is to provide a compressor having a valve assembly which has a minimum amount of sealing area thereon and has an increased valve area. These and other objects of my invention will be more readily apparent from the following description.

This invention relates to reciprocating compressor having a cylinder, a cylinder head, and a valve assembly separating the cylinder head and the cylinder. The cylinder is provided with first and second spaced shoulders. The first shoulder has located therein an annular recess in communication with the suction gas line. The valve assembly includes a valve plate having a plurality of holes annularly disposed and passing through the plate. A circular discharge valve is connected to the plate and adapted to seat over said holes. Encircling the plurality of holes are first and second concentric circles of openings, having passage means within the plate which place the first and second circles of openings in communication. A suction valve covers the first circle of openings and the valve further includes a sealing surface between the first and second circles of openings adapted to engage the first shoulder whereby the second circle of openings is placed in registry with the annular recess in the first shoulder and the first circle of openings is in communication with the cylinder. The suction valve which seats on the first circle of openings has located thereon along the periphery thereof a plurality of protuberances which engage the second shoulder thereby limiting the motion of said valve.

The attached drawings illustrate a preferred embodiment of the invention, in which.

Figure 1:
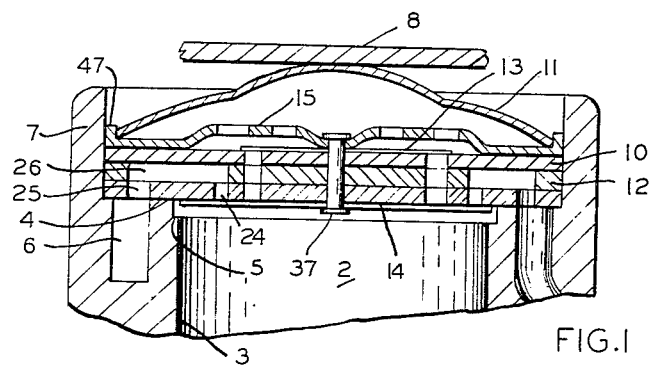
Figure 1 is a view in section of the valve arrangement comprising the present invention.

Referring to Figure 1, there is shown a fragmentary sectional view of the head section of a reciprocating compressor including the valve arrangement comprising the present invention. There is shown a cylinder 2 which is defined by the cylinder wall 3. The cylinder wall 3 has a first shoulder 4 and a second shoulder 5 spaced therefrom. The first shoulder is of substantially greater width than the second shoulder and has located therein an annular recess 6. This annular recess is in communication with a source of suction gas which is intended to be drawn into the cylinder and compressed therein. Extending from the first shoulder is a cylinder flange 7.

Above the cylinder there is shown a fragmentary portion of a cylinder head 8. This cylinder head may be of the individual head type as commonly utilized wherein a cast member is bolted to the compressor block, or in a preferred arrangement this construction may be the shell which encompasses the cylinders as shown in my copending application previously mentioned.

Mounted on the first shoulder is a valve assembly 10. This valve assembly 10 is maintained in position by a spring member 11 which is biased between the valve assembly 10 and the cylinder head member 8. Other types of valve assembly retaining means may be utilized as for example the use of an expansion spring locked in an annular recess in the flange 7 will function similarly by locking the valve assembly in the position shown in Figure 1.

Figure 2:
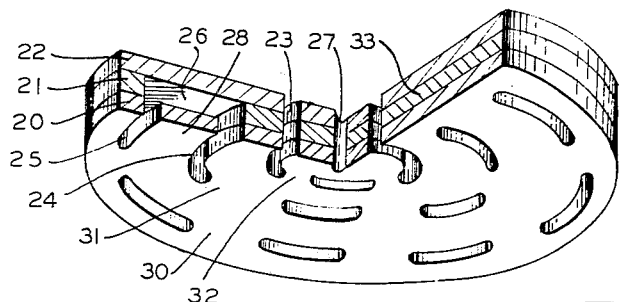
Figure 2 is a perspective view of the valve plate with a section removed to indicate the interior construction of the member.

The valve assembly 10 as shown in Figure 1 comprises a valve plate 12 shown in Figure 2. Connected to this valve plate is a discharge valve 13 and a suction valve 14, also a valve movement limiting means 15, all of which are attached to the valve plate by means of a rivet 16.

Referring to Figure 2, there is shown a perspective view of the valve plate utilized in the present invention with a section thereof removed to indicate the inner construction thereof. This valve plate comprises the plates 20, 21, and 22. These plates are of a circular construction and are sandwiched together by suitable bonding means to form an integral structure of a laminated form. The plates have a center hole 27. Extending outwardly from the center hole 27 and concentric therewith are a plurality of discharge holes 23 passing through all the plates 20, 21, and 22. At a greater diameter there is shown other circles of openings 24 and 25. These openings do not pass through the plate, but merely comprise openings in the plate 20. In the intermediate plate 21 there is a circle of openings 26 which comprise passage means between the openings 24 and 25.

It will be appreciated that constructions are possible in which some of these passages and openings in the plate may be of a single annular construction. However, in this embodiment web sections 30 are placed between the holes 25, also web sections 31 lie between the openings 24 and webbed sections 32 are located between the holes 23. With respect to the intermediate plate 21, webbed section 33 is provided therein giving strength to this particular plate.

Located between the circle of openings 24 and the circle of openings 25 is an annular sealing surface which is adapted to seal against shoulder 4 thereby placing the openings 25 and 24 only in communication by means of the passage 26.

Figure 3:
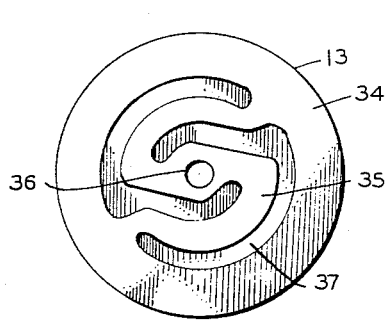
Figure 3 is a plan view of the discharge valve.

Referring to Figure 1, there is shown a discharge valve 13 mounted above the valve plate 12. This discharge valve as is further shown in Figure 3 comprising a flat plate of spring steel having an annular portion 34 and a deflecting portion 35 the center of which has an opening 36 adapted to be suitably mounted to the valve plate 12 by means of the rivet 37.

It will be noted by referring to Figure 1 that the annular section 34 lies over the openings 23 in the valve plate. Gases passing through the valve plate therefore if under sufficient pressure will urge the annular section 34 to unseat from these openings by means of deflecting the section 35 of the valve. It will be appreciated at this point that the S-shaped deflecting portion 35 may have substituted therefor other configurations such as a normal spoke construction whereby the deflecting section comprises radially extending spokes extending from the center of the valve.

Figure 4:
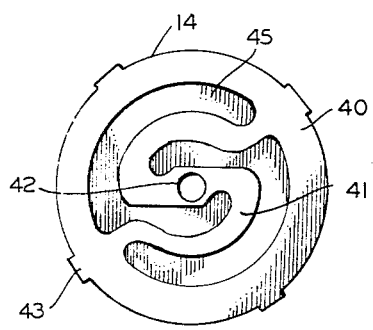
Figure 4 is a plan view of the suction valve.

Mounted to the underside of the valve plate 12 is a suction valve 14 which is further shown in Figure 4. This valve is of a similar construction as the discharge valve having an annular portion 40, a deflecting portion 41 which has a general S-shape having a center hole 42 adapted to be attached to the valve plate by means of the rivet 37. However, this particular valve has an added feature; namely protuberances 43 are provided along the peripheral edge of the valve for a purpose to be described more fully hereinafter. It will also be noted that this valve has arcuate openings 45. These openings between the S-shaped portion 41 and the annular portion 40 are oriented so that gases may pass through the suction valve and thereby reach the openings 23 in the valve plate and thereby permit the gases to pass through the valve assembly when the suction valve is in a closed position.

Figure 5:
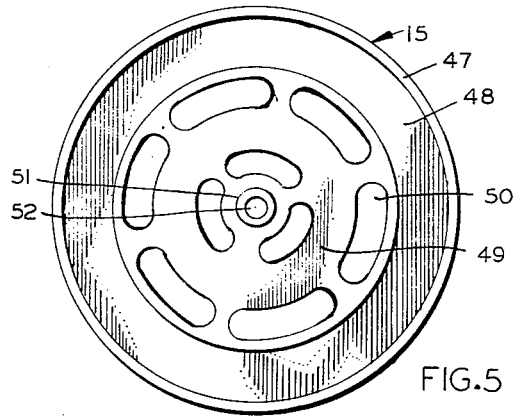
Figure 5 is a plan view of the discharge valve movement limiting means.

In order to limit the movement of the discharge valve during operation, a valve movement limiting means is provided in the form of the plate 15. Referring to Figure 5, there is shown a plan view of this particular element. This member comprises an annular flange portion 47 which is of substantially the same diameter as the valve plate 12. Adjacent this flange portion 47 there is located a flat annular section 48 which, by referring to Figure 1 as noted is mounted against the valve plate 12. Extending from this flat section is a dished portion 49 which is spaced from the valve plate and has located therein a plurality of perforations 50. At the center of this element there is a center section 51 which extends adjacent the valve plate 12. This center section 51 has a center hole 52 through which extends the rivet 37 which maintains the valve plate, suction valve, discharge valve, and valve movement limiting means, as an integral construction.

Figure 6:
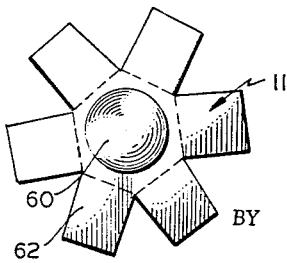
Figure 6 is a plan view of the valve assembly retaining means.

In order to maintain the valve assembly in position, the valve spring 11 is provided. A plan view of which is shown in Figure 6. This valve spring comprises a center dome section 60 which is more clearly shown in Figure 1 and a plurality of leg sections 62 which extend therefrom and are adapted to contact the area adjacent the flange 47 on the valve movement limiting means 15. With the legs in contact with the valve assembly, the dome section of this spring is biased against the cylinder head 8 of the compressor thereby urging the valve assembly against the first shoulder 4.

Considering the operation of this valve construction, on the suction stroke of the compressor piston, suction gas is drawn from the annular recess 6 through the opening 25 in the valve plate through the passage 26 in the valve plate and then through the opening 24 into the cylinder. This occurs on the suction stroke since the gases passing through this general U-shaped passage will urge the annular seating section 40 of the suction valve 14 to unseat from the port, permitting gases to pass. This is possible since the S-shaped section 41 acts as an extended beam capable of deflecting from the center portion 42. At the end of the suction stroke, the piston begins the compression stroke, causing the pressure within the cylinder 2 to increase. The gases are no longer able to pass through the U-shaped suction passage in the valve plate since the suction valve seats, thereby acting as a check valve and substantially sealing the suction recess 6 from the cylinder. As the pressure within the cylinder increases the gas bypasses the center section of the suction valve by passing through the arcuate openings 45 in the suction valve.

The gases then pass through the circle 23 of openings and because of the higher pressure, will tend to unseat the section 34 of the discharge valve by the same action as unseated the suction valve, that is the deflection area 35 is suitably moved permitting the gas to pass into the cylinder head. The gases then pass up through the perforations in the member 15 and are discharged from the compressor.

In order to assure long life to the valve members and to prevent any danger of excessive stresses, valve limiting means are provided for both the suction and discharge valves. On the suction valve a plurality of protuberances 43 are provided along the periphery of the valve. During operation when the valve deflects, these protuberances are of sufficient size so as to abut against the second shoulder 5 provided in the cylinder wall 3. Therefore the distance between the first and second shoulders of the cylinders determines the distance of valve travel of the suction valve.

With respect to the discharge valve, the member 15 is provided which in effect acts as a cage and the distance between the disc portion 49 and the valve plate determine the distance of valve travel of the discharge valve.

It is apparent from the above description that a valve arrangement is provided whereby a small inexpensive valve is disclosed which has only one sealing side, means are provided to limit the movement of the valve members and furthermore the assembly includes both suction and discharge valves in a small inexpensive unitary construction.

While I have described a preferred embodiment of my invention, it will be understood that my invention is not limited thereto since it may be otherwise embodied within the scope of the following claims.

I claim:
1. A reciprocating compressor comprising a cylinder having a first shoulder containing an annular recess in communication with a source of suction gas, a valve plate having a general disk shape, said valve plate having a circle of holes therethrough, a discharge valve adapted to close said circle of holes, said plate having a first circle of openings therein, and a second circle of openings on the same side of the plate, passage means in the plate for connecting the first and second circles of openings, a suction valve covering the first circle of openings, said suction valve having protuberances thereon, said valve plate being in sealing engagement with the first shoulder, the second circle of openings being placed in registry with the annular recess in the first shoulder and means maintaining the valve plate in engagement with the first shoulder, said cylinder having a second shoulder serving as a stop member, the protuberances of the suction valve abutting against the second shoulder upon the suction stroke of the compressor to limit movement of the suction valve.

2. A reciprocating compressor comprising means defining a cylinder, means defining a wall over said cylinder, said cylinder having a first shoulder and a second shoulder spaced therefrom, said first shoulder having an annular recess in communication with a source of suction gas, a generally disk-shaped valve plate, said valve plate having a circle of holes therein, a first valve attached to one side of said valve plate and adapted to close said circle of holes, said plate having a first circle of openings therein on the other side thereof, said plate having a second circle of openings on the same side of the plate as the first circle of openings, passage means in the plate connecting the first and second circle of openings, a second valve attached to said other side of the valve plate to cover the first circle of openings, said other side of the valve plate being in sealing engagement with the first shoulder placing the second circle of openings in registry with the annular recess in the first shoulder, and means between the wall and the valve plate for maintaining the valve plate in sealing engagement with the first shoulder, said second shoulder limiting the movement of the second valve.

References Cited in the file of this patent

UNITED STATES PATENTS

| | | |
|---|---|---|
| 1,476,794 | Berry | Dec. 11, 1923 |
| 1,996,762 | Halleck | Apr. 9, 1935 |
| 2,036,799 | Duryee | Apr. 17, 1936 |
| 2,247,449 | Neeson | July 1, 1941 |
| 2,433,302 | Snyder | Dec. 23, 1947 |
| 2,757,819 | Badger | Aug. 7, 1956 |

FOREIGN PATENTS

| | | |
|---|---|---|
| 145,015 | Sweden | Dec. 27, 1954 |
| 741,752 | Germany | May 12, 1943 |
| 866.712 | Germany | July 8, 1949 |